Figure 1:
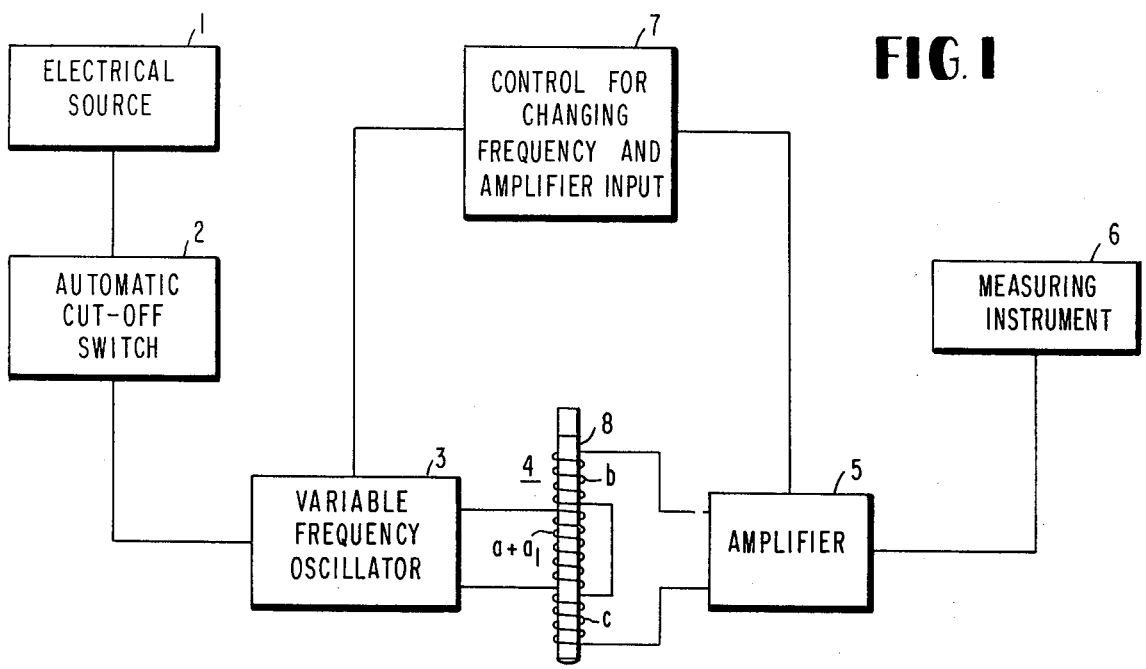

United States Patent [19]
Nix et al.

[11] 3,986,105
[45] Oct. 12, 1976

[54] DUAL PURPOSE ELECTROMAGNETIC THICKNESS GAUGE

[75] Inventors: Hans F. Nix, Cologne; Erich Steingroever, Bonn, both of Germany

[73] Assignee: Elektro-Physik, Hans Nix & Dr. -Ing. E. Steingroever KG, Cologne, Germany

[22] Filed: Feb. 14, 1975

[21] Appl. No.: 550,127

[30] Foreign Application Priority Data
Mar. 2, 1974 Germany............................ 2410047

[52] U.S. Cl............................................ 324/34 TK
[51] Int. Cl.².......................................... G01R 33/12
[58] Field of Search......................... 324/34 TK, 40

[56] References Cited
UNITED STATES PATENTS
| | | | |
|---|---|---|---|
| 2,920,269 | 1/1960 | Hanysz et al. | 324/34 TK |
| 3,761,804 | 9/1973 | Steingroever | 324/34 TK |

FOREIGN PATENTS OR APPLICATIONS
| | | | |
|---|---|---|---|
| 484,664 | 5/1938 | United Kingdom | 324/40 |

OTHER PUBLICATIONS
Bennett et al., A Review of Methods for Coating-Thickness Determ., Jour. of Scien. Inst., vol. 26, June, 1949, pp. 209-215.
Dick, P. Measuring Thickness of Paramagnetic Coating; Electronics; Feb., 1961, pp. 48-50.
Dodd et al., Thickness Measurements Using E.C. Techniques Material Eval.; May, 1973, pp. 73-84.

*Primary Examiner*—Robert J. Corcoran
*Attorney, Agent, or Firm*—George H. Mitchell, Jr.

[57] ABSTRACT

A probe for electromagnetic measurement of the thickness of a layer of material applied to a base of dissimilar material consists of an elongated ferromagnetic core surrounded by an electrical coil several diameters larger than the diameter of the core and having one end placed close to the plane of the pole face of the core so that measurements involving magnetic materials can be undertaken by utilizing variations in magnetic flux path at low energization frequencies while measurements involving electrically conductive materials are undertaken by utilizing eddy currents induced at high energization frequencies.

22 Claims, 2 Drawing Figures

DUAL PURPOSE ELECTROMAGNETIC THICKNESS GAUGE

The present invention relates to electromagnetic gauges for measuring the thickness of a layer, or thin film, of one material applied to a base composed of a dissimilar material.

Electromagnetic gauges for the measurement of the thickness of a layer of non-magnetic material applied to a magnetic base, or vice versa, are known, in which the variation in the magnetic conductivity of the flux path between a ferromagnetic core means and the magnetic material is utilized to provide an indication of the thickness of the layer in contact with a pole piece of the probe means. One example of such a gauge is disclosed and claimed in our copending application, Ser. No. 501,354, filed Aug. 28, 1974, now U.S. Pat. No. 3,922,599 for Electromagnetic Gauge for Measuring the Thickness of Layers, and in U.S. Pat. No. 3,761,804 granted to Erich Steingroever, Sept. 25, 1973, for Low Saturation Pole Piece for a Magnetic Thickness Gauge.

Electromagnetic gauges are also known for use in the measurement of a layer, or film, of electrically non-conductive material applied to an electrically conductive base, or vice versa which gauges include a probe means having a coil, or winding, which is energized by an alternating current to produce an electromagnetic field. The eddy currents which are induced in the conductive material by the probe means react thereon to vary an electrical characteristic, such as inductance, or voltage, in the probe means is dependent upon the distance of the probe from the conductive material in one case, or upon the thickness of the conductive material in the other case. One example of a thickness measuring gauge of this type is disclosed in U.S. Pat. No. 3,815,016, granted June 4, 1974, for Method of Measuring Thickness of Non-Metallic Paving Material with Compensation for Properties of the Material.

The present invention, therefore, relates to electromagnetic thickness measuring instruments for the measuring of layers, or films, on a magnetic base by means of a magnetic induction process in the case of materials such as paint, lacquer or plastic applied to iron or steel, or vice versa and also for measuring electrically conductive coatings, layers or films on a non-conductive base by means of the eddy current process, such materials including, for example, paint, lacquer or plastic on aluminum, or copper and vice versa, as well as the thickness of an oxide coating on a material such as aluminum or copper.

In the past, it has not been found possible to combine in a single instrument, the capability for measuring thicknesses of materials by both the magnetic induction method and the eddy current method, particularly because of the fact that the measurement of magnetic induction is based on magnetic flux changes which are adversely affected when eddy currents are also present.

Therefore, it is an object of the present invention to provide a dual purpose electromagnetic thickness measuring gauge which is capable of measuring the thickness of a layer of one material applied to a base of dissimilar material whether the measurement is based on magnetic induction, or eddy currents.

According to the invention, this object is accomplished by a single instrument utilizing a single probe means which, when energized by alternating at one frequency is responsive to provide measurements of variations in magnetic induction and at another frequency to provide indications of induced eddy current variations.

When the probe means is to be used in the measurement of non-magnetic layers on a magnetic base by the magnetic induction process, the probe is energized by an alternating current at a frequency less than 300 Hz, whereas when electrically conductive layers applied to a non-conductive base are measured in accordance with the eddy current process, a frequency in excess of 1000 Hz is used.

In a preferred form of the invention, the probe means includes an elongated ferromagnetic core surrounded by a measuring coil whose diameter is at least twice that of the diameter of the core and preferably having an outside diameter three times the diameter of the core, in order to provide a reasonably long flux path through the material being measured.

Preferably, the ferromagnetic core of the probe means is composed of a material having high electrical resistivity, at least several times that of pure iron, combined with low magnetic saturation having a value less than 14,000 gausses.

Figure 2:
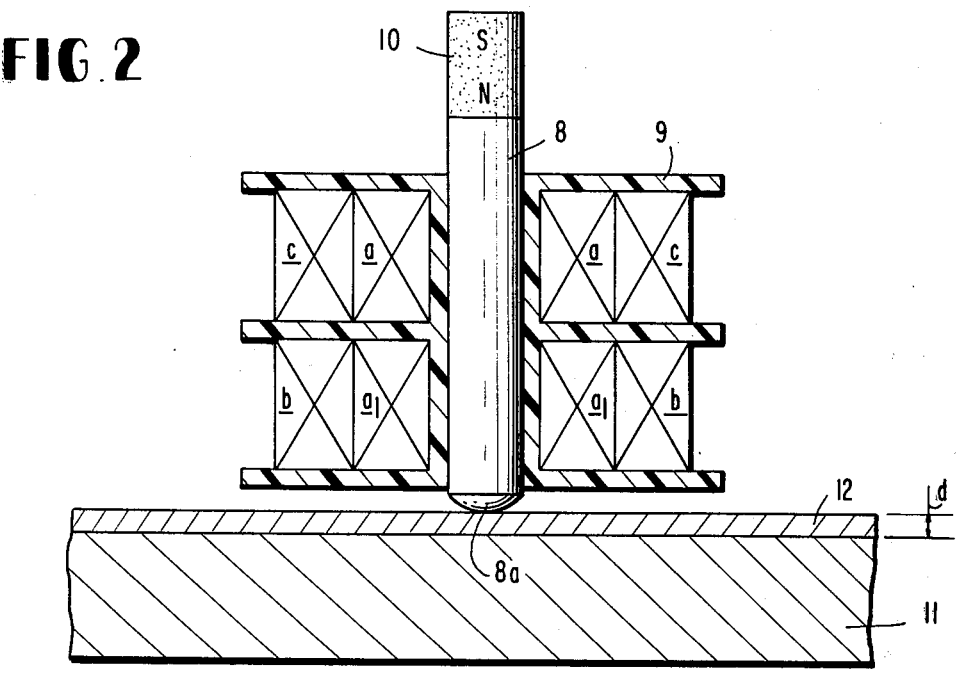

Other objects and advantages will be apparent to those skilled in the art after reading the following specification in connection with the annexed drawings, in which FIG. 1 is a schematic diagram of an arrangement of elements comprising a preferred form of thickness measuring instrument according to the invention, and;

FIG. 2 is an elevation in cross section, of a probe means included in the diagram of FIG. 1.

In the drawings, the numeral 1 indicates a source of electrical energy which may be an electrical wall outlet or, in the case of a portable instrument, a battery, which may be used to energize an oscillator circuit, indicated by numeral 3. In the case of battery operation, the energy source 1 can be connected to oscillator 3 through an automatic cut-off switch mechanism 2 which is designed to disconnect the battery after a predetermined period of time, say ten minutes, has elapsed from the time of initial energization in order to conserve the battery when not in use.

The output of the oscillator is supplied to the energizing coil of the probe means, indicated generally by numeral 4 and shown in detail in FIG. 2. The probe means also includes measuring coils b and c, which are connected to the input of an amplifier 5, whose output can be connected to any appropriate indicating instrument 6, which could be a meter, or other type of measuring instrument such as a recording instrument.

The oscillator 3 can be of any conventional design capable of transforming the energy received from supply 1 to energize the probe coil selectively at either one of two frequencies, one of which is below 300 Hz, the other being above 1000 Hz under the control of a switching mechanism 7 which also simultaneously regulates the amplifier 5. The oscillator may be variable continuously, or in steps, within ranges of frequencies which includes those used by the two methods employed by the probe means, or may be adjusted to a single low frequency and a single high frequency for selective switching between the two. Apparatus of this type is known in the art and forms no part of this invention.

Since the voltage produced in the measuring coil of the probe means 4 will vary in accordance with the frequency of the current supplied to the energizing coil and the kind of material being measured, the amplifier 5 should be capable of being selectively adjusted by the switching mechanism 7 to accept the particular range of voltages in accordance with the particular frequency at which the oscillator 3 is operating. These devices are also known, and form no part of the invention.

In FIG. 2, a preferred form of probe means is shown, in which an elongated ferromagnetic core 8 is shown as being provided at one end with a convex surface 8a. The composition of this core should be such that it has a low magnetic saturation, preferably less than 14,000 gausses and high electrical resistivity.

Several examples of materials suitable for the core are disclosed in the above mentioned U.S. Pat. No. 3,761,804. One such alloy consists of Fe with 13 to 18 percent Al, preferably 16 percent Al. In order to increase the hardnes, up to 8 percent of Al may be replaced by Si, and small additions of other elements which do not affect the desired characteristics are possible. So-called "soft" ferrites, such as manganese-zinc-ferrite or nickel-zinc-ferrite may also be used.

Surrounding the core 8 is a coil form 9 of any suitable material, such as plastic. The inner section of the coil form is provided with two windings $a$ and $a_1$ which are connected additively to constitute the energizing coil supplied by oscillator 3. The outer portion of the coil form supports a pair of measuring coils $b$ and $c$ which are connected in opposition to each other. The coils $a$ and $a_1$ could be a single coil but, for convenience in manufacturing and, since there are two measuring coils, it is more practical to wind the energizing coil on the form in two sections. However, the radial thickness of the energizing coil should be such that the inner diameter of the coils $b$ and $c$ will be at least twice the diameter of the core 8, while the outer diameter of the measuring coils should be at least 3 times the diameter of the core. In order to reduce the air gap, especially when measuring thicknesses by the eddy current process, one end of the coils should be located as close as possible to the convex surface 8a of the pole core.

The output of the measuring coils $b$ and $c$ is connected to the input of an amplifier 5 which, in turn operates an indicator, or measuring instrument 6. Since the coils $b$ and $c$ are connected in opposition their combined output to the amplifier is the difference between the voltages induced in the two coils and, since these voltages are a function of the magnetic induction between the pole core 8 and the magnetic material in the vicinity of the pole face 8a in the one case, and the eddy currents produced by adjacent conductive material in the other case, these voltages provide an indication of the thickness of the layers being measured. Instead of indicating voltages, the measuring instrument 6 can be calibrated to read directly in terms of thickness.

When the instrument is being used for measurement by the magnetic induction method at frequencies below 300 Hz, the range of voltages from the coils $b$ and $c$ will lie between certain limits which will be lower than the range of voltages produced when the energizing coil is operated at the higher frequencies, over 1000 Hz for measurements by the eddy current process. In addition, in the latter case, there is a greater fluctuation in voltage between the lower and upper limits of the voltage range.

Therefore, the amplifier 5 is provided with means for adjusting its input to selectively accept voltages developed within either range, and the switching mechanism 7 is connected with both the oscillator 3 and amplifier 5 to simultaneously condition both of these circuits for selective operation in either the magnetic induction mode or the eddy current mode.

While the invention, as just described, is completely operative, it may be desireable for use in the measurement of certain materials to pre-magnetize the core 8 by the addition of an elongated premanent magnet 10, having N and S poles, at the end away from the pole face 8a. Such an arrangement is disclosed and claimed in our copending application Ser. No. 501,354 filed Aug. 28, 1974, for Electromagnetic Gauge for Measuring the Thickness of Layers. The advantage of using a premagnetizing device is that the instrument can be calibrated in such a way that the sensitivity of the instrument can be made generally independent of the thickness of the layer being measured. Furthermore, as described and claimed in said copending application, Ser. No. 501,354, the premagnetizing device could also consist of a coil arranged in alignment with the pole core and energized by direct current. The amount of premagnetizing can be varied by using magnets of different sizes, or by adjusting the voltage, if a coil is used.

In operation, the device may be used to determine the thickness $d$ of a layer of material 12 applied to a base 11 composed of a dissimilar material, by placing the convex pole face 8a in contact with the layer to be measured and at right angles thereto.

These dissimilar materials generally fall into one of two main classes, namely, (1) magnetic materials as compared to non-magnetic materials, and (2) electrically conductive materials as compared to electrically non-conductive materials. Thus, the layer 12 to be measured may be a non-magnetic material applied to a base 11 of magnetic material, and vice versa, or, the layer 12 may be an electrically non-conductive material applied to a conductive base 11, or vice versa.

For the purpose of this invention, it may be considered that the term "magnetic material" is intended generally to include iron, nickel, cobalt and their alloys. All of the other metals may be considered to be "non-magnetic".

Also, while it is true that iron, nickel and cobalt and their alloys are also electrically conductive, for the purposes of this invention it may be considered generally that all of the other metals, including copper, aluminum and zinc and their alloys to be treated as "electrically conductive".

It is also recognized that certain of the alloys of a magnetic material, such as steel for example, may also be electrically conductive, but for the purpose of obtaining thickness measurements when such anomalous materials comprise one of the materials involved better results may be obtained by using the magnetic induction method.

When the instrument is to be used, according to the magnetic induction process, for the measurement of materials of the first class (magnetic — non-magnetic) the switching control 7 is set to adjust to oscillator 3 to operate at a frequency below 300 Hz and simultaneously to adjust the amplifier 5 to the expected voltage output range from the measuring coils $b$ and $c$.

If, for example, the layer 12 to be measured is a coating of paint on a steel plate 11, the energizing coil $a$, $a_1$ can be operated at a frequency between 30–100 Hz with good results. On the other hand, if the thickness measurement involves two dissimilar materials of the second class, for example, measurement of the oxide coating on an aluminum plate by the eddy current process, the energizing coil will be operated at some frequency above 1000 Hz. In this case, a frequency between 3000 and 10,000 should be used. Also, the voltages at the input to the amplifier 5 will be greater than with the magnetic induction process, so that the amplifier is simultaneously adjusted to accept these voltages by the switching device 7 simultaneously with the change in energization frequency.

Operation of the instrument by the magnetic induction process is based on the fact that the voltages in the measuring will vary as the pole core surface 8a approaches, or recedes from, either a magnetic material or an electrically conductive material. In the case of a magnetic material, the magnetic flux in the pole core will increase as it approaches because of the increase of magnetic conductivity in the magnetic path. By the same token, if the layer to be measured is a magnetic material, applied to a non-magnetic base, an increase in the thickness of the measured material will increase the magnetic conductivity of the magnetic path.

It is also true that when the pole core approaches an electrically conductive material the flux decreases because of the eddy currents produced and, that these eddy currents introduce undesireable errors when one attempts to measure electrically conductive materials by the magnetic induction method.

However, in the present invention, these disadvantages are overcome, in part, by using a higher frequency, which decreases the influence of the ferromagnetic core. Also, because of the large diameter of the measuring coils and their close proximity to the surface to be measured further decreases the influence of the core so that under these conditions, the eddy current changes are predominant and can be used as reliable indications of thickness.

Furthermore, while it is considered that measurements involving magnetic materials should utilize frequencies below 300 Hz, while those involving conductive materials require frequencies above 1,000 Hz, it should be understood that within each of the two classes of materials, there may be a specific frequency which provides more suitable results with a particular material, or within certain ranges of thickness of that material, than some other frequency within the respective overall range of frequency for that class of material.

It should also be realized that, while it is convenient to use the voltage output of the measuring coils as an indication of the thickness of materials, other electrical characteristics, such as current, capacity or phase shift, induced in these coils, could also be used.

What is claimed is:

1. In a dual purpose probe means for electromagnetic thickness gauges, the combination including an elongated ferromagnetic core means, electrical energizing and measuring coil means inductively coupled with said core means, and means for selectively energizing said energizing coil means at one frequency for measuring the thickness of a layer of non-magnetic material on a magnetic supporting base and vice versa, and for energizing said coil means at a second higher frequency for measuring the thickness of a layer of electrically non-conductive material on an electrically conductive supporting base and vice versa, an electrical characteristic generated in said measuring coil means at said one frequency being variable as a function of the magnetic conductivity of the flux path between said core means and the magnetic material, an electrical characteristic generated in said measuring coil means at second frequency being variable as a function of eddy currents induced in the electrically conductive material, said measuring coil means being positioned concentrically with respect to said elongated core means and having a diameter such that the influence of the core means is decreased at said second frequency and the electrical characteristic generated in said measuring coil means by eddy currents is predominant.

2. The invention defined in claim 1, wherein said one frequency is below 300 Hz, and said second frequency is above 1,000 Hz.

3. The invention defined in claim 2, wherein said ferromagnetic core means comprises an elongated body having a pole at one end for contact with a surface to be measured, and said measuring coil means surrounds said core means, the inner surface of said coil means being radially spaced from the outer surface of the core means.

4. The invention defined in claim 3, wherein said core means and measuring coil means are concentrically positioned and the diameter of the coil means is at least twice the diameter of the core means.

5. The invention defined in claim 4, wherein the diameter of the coil means is at least three times the diameter of the core means.

6. The invention defined in claim 1, wherein said core means comprises an elongated rod having a pole surface at one end, and said measuring coil means comprises a cylindrical coil mounted concentrically on said core means, one end of said coil means being disposed in a radial plane closely adjacent the extremity of said pole surface.

7. The invention defined in claim 6, wherein said second frequency is above 1,000 Hz.

8. The invention defined in claim 7, wherein said energizing coil means comprises an electrical coil means disposed within said measuring coil means and surrounding said core means.

9. The invention defined in claim 8, wherein said measuring coil means comprises a pair of substantially identical coils disposed in axial alignment and connected in opposition to each other.

10. The invention defined in claim 9, wherein said core means includes a form having three radially extending axially spaced coil supporting surfaces which define two annular spaces, said energizing coil means comprising two coils positioned within the respective inner portions of said annular spaces and connected in additive relationship to each other, said measuring coils being positioned on said energizing coils in the respective annular spaces.

11. The invention defined in claim 1, wherein said ferromagnetic core means comprises a material having high electrical resistivity and low saturation magnetization.

12. The invention defined in claim 11, wherein the saturation magnetization of the core means is less than 14,000 gausses.

13. The invention defined in claim 12, wherein said core means comprises an alloy of Fe and Al.

14. The invention defined in claim 13, wherein said alloy consists of up to and including 16% Al.

15. The invention defined in claim 14, wherein up to and including 8% of said Al is replaced by Si.

16. The invention defined in claim 11, wherein said ferromagnetic core means comprises a soft magnetic ferrite material.

17. The invention defined in claim 1, wherein said ferromagnetic core means comprises an elongated rod having one end provided with a convex surface defining a pole face for contact with a surface to be measured, said measuring coil means surrounding said rod.

18. The invention defined in claim 17, wherein said energizing coil means surrounds said rod, said measuring coil means also surrounding the energizing coil means.

19. The invention defined in claim 18, wherein said probe means may be energized at any one of a plurality of frequencies of alternating current depending upon the characteristics of the layer to be measured.

20. The invention defined in claim 19, wherein said core means also includes means for adjustably premagnetizing said elongated rod.

21. The invention defined in claim 20, wherein said means for premagnetizing includes a permanent magnet positioned adjacent the end of the rod opposite from said pole face.

22. The invention defined in claim 20, wherein said means for premagnetizing includes an electrical coil to be energized by direct current positioned adjacent the end of the rod opposite from said pole face.

* * * * *